(12) United States Patent
Robinson

(10) Patent No.: US 8,220,262 B2
(45) Date of Patent: *Jul. 17, 2012

(54) METHOD FOR MANUALLY CONTROLLING A TURBOCHARGER

(75) Inventor: James S. Robinson, Delaware, OH (US)

(73) Assignee: Honda Motor Co., Ltd., Tokyo (JP)

( * ) Notice: Subject to any disclaimer, the term of this patent is extended or adjusted under 35 U.S.C. 154(b) by 164 days.

This patent is subject to a terminal disclaimer.

(21) Appl. No.: 12/579,477

(22) Filed: Oct. 15, 2009

(65) Prior Publication Data

US 2010/0024786 A1 Feb. 4, 2010

Related U.S. Application Data

(63) Continuation of application No. 11/735,343, filed on Apr. 13, 2007, now Pat. No. 7,621,127.

(51) Int. Cl.
F02D 23/00 (2006.01)
F02D 41/22 (2006.01)
F02D 41/14 (2006.01)
F02B 33/44 (2006.01)
G06F 17/00 (2006.01)
G06F 7/00 (2006.01)
B60K 28/16 (2006.01)

(52) U.S. Cl. ......... 60/602; 60/605.1; 180/197; 701/103

(58) Field of Classification Search ............ 60/600–603, 60/605.1; 180/180, 197; 701/103
See application file for complete search history.

(56) References Cited

U.S. PATENT DOCUMENTS

| 2,389,281 | A | * | 11/1945 | Staley | 73/112.01 |
| 4,598,549 | A | | 7/1986 | Kanawyer | 60/611 |
| 4,891,946 | A | | 1/1990 | Inoue | 60/602 |
| 5,073,865 | A | | 12/1991 | Togai et al. | 701/103 |
| 5,076,060 | A | | 12/1991 | Adeff | 60/608 |
| 5,214,919 | A | | 6/1993 | Jiewertz et al. | 60/602 |
| 5,454,767 | A | | 10/1995 | Clausen et al. | 477/32 |
| 5,778,329 | A | | 7/1998 | Officer et al. | 60/602 |
| 6,272,859 | B1 | | 8/2001 | Barnes et al. | 60/602 |
| 6,474,318 | B1 | | 11/2002 | Jones et al. | 123/564 |
| 6,658,849 | B1 | | 12/2003 | Hallman et al. | 60/602 |
| 6,662,562 | B2 | | 12/2003 | Engel et al. | 60/602 |
| 6,786,044 | B2 | | 9/2004 | Jones et al. | 60/602 |
| 6,830,121 | B1 | | 12/2004 | Johnson | 60/602 |
| 7,621,127 | B2 | | 11/2009 | Robinson | 60/602 |

(Continued)

FOREIGN PATENT DOCUMENTS

JP 57051528 A * 3/1982

OTHER PUBLICATIONS

Information Disclosure Statement filed Jul. 19, 2007 in U.S. Appl. No. 11/735,343.

(Continued)

Primary Examiner — Thai Ba Trieu
(74) Attorney, Agent, or Firm — Plumsea Law Group, LLC; Mark E. Duell

(57) ABSTRACT

A method and a system for manually controlling a turbocharger is disclosed. The method includes steps for selecting a minimum boost pressure and a maximum boost pressure. The method also includes steps for selecting a pre-configured boost mode, including a predefined boost pressure minimum and a predefined boost pressure maximum.

20 Claims, 5 Drawing Sheets

U.S. PATENT DOCUMENTS

2006/0288702 A1   12/2006   Gokhale et al. .................. 60/602
2008/0196404 A1    8/2008   Kassner .......................... 60/600

OTHER PUBLICATIONS

Office Action mailed Feb. 25, 2009 in U.S. Appl. No. 11/735,343.

Response to Office Action filed May 22, 2009 in U.S. Appl. No. 11/735,343.
Notice of Allowance mailed Jul. 15, 2009 in U.S. Appl. No. 11/735,343.
Supplemental Notice of Allowability mailed Oct. 23, 2009 in U.S. Appl. No. 11/735,343.

* cited by examiner

METHOD FOR MANUALLY CONTROLLING A TURBOCHARGER

CROSS REFERENCE TO A RELATED APPLICATION

This application is a continuation of U.S. Pat. No. 7,621,127 B2, currently U.S. patent application Ser. No. 11/735,343, titled "Method for Manually Controlling a Turbocharger", filed on Apr. 13, 2007, the entirety of which is incorporated by reference.

BACKGROUND OF THE INVENTION

1. Field of the Invention

The present invention relates to motor vehicles and in particular to a method for controlling a turbocharger.

2. Description of Related Art

Methods for manually controlling a turbocharger have been previously disclosed. Johnson (U.S. Pat. No. 6,830,121) is directed to a control system for increasing the fuel economy in a combustion engine by controlling the limit of turbo boost under a given set of conditions related to vehicle speed. Johnson teaches a system where the boost pressure limit (BPL) may be switched on and off with a first switch, and the boost pressure limit value may be adjusted using a second switch. Although Johnson teaches a boost pressure limit, or boost pressure maximum, Johnson fails to teach a system where the user may set a boost pressure minimum or a fixed boost pressure value.

Kanawyer (U.S. Pat. No. 4,598,549) is directed to a turbocharger manifold pressure control system. Kanawyer teaches a turbocharger system including a two position switch where the user selects between a low boost pressure maximum and a high boost pressure maximum. By selecting the low position of the switch, the turbocharged system is configured so that the boost pressure will never exceed the low boost pressure maximum. This may be useful in situations where the user wants to conserve gas or generally maintain low boost pressures within the turbocharged system. By selecting the high position of the switch, the turbocharged system is configured so that the boost pressure will never exceed the high boost pressure maximum. This high switch setting allows the user to make full use of high boost pressures that can be achieved using the turbocharged system.

Kanawyer does not teach the use of multiple switch settings (low, high and intermediate, for example), Kanawyer only teaches the use of a low or high maximum boost pressure setting. Kanawyer also fails to teach the concept of manually selecting a minimum boost pressure.

Jiewertz (U.S. Pat. No. 5,214,919) is directed to an arrangement for regulating the response of an internal combustion engine with a turbocharger. Jiewertz teaches a manual control setting that allows the user to adjust the maximum boost pressure. This is done in order to reduce the jerkiness of the vehicle due to sudden changes in torque that may occur in a turbocharged engine where the boost pressure is allowed to vary dramatically.

Jiewertz discusses two specific manually selected boost pressure settings, a "sporty" mode and a "soft" mode. In the sporty mode, the maximum boost pressure is always available under any load condition of the engine. While this mode provides immediate throttle response, the engine can feel "jerky" to inexperienced drivers. In the soft mode, the maximum boost pressure may be fixed at a lower value for small throttle angles (small engine loads) and at an intermediate value for medium throttle angles (moderate engine loads). By limiting boost pressure at low engine loads, this arrangement helps to improve smoothness under low engine loads. As the engine load increases (represented by increased throttle angle), the soft mode setting is gradually over-ridden, and additional boost pressure is available at greater throttle angles.

Jiewertz does not teach the use of manually selected minimum boost pressures. Additionally, Jiewertz does not teach the use of manually selected ranges for boost pressure. Also, although Jiewertz does teach a manual control setting for adjusting the maximum boost pressure, this value is not constant and is designed to be over-ridden under increasing engine loads, represented by throttle angle. Therefore, the user cannot manually adjust the maximum boost pressure to a value determined by the user. Also, Jiewertz does not teach or suggest the concept of forcing a turbocharger to maintain a minimum boost pressure.

There is a need in the art for a system and method that addresses the problems of the prior art.

SUMMARY OF THE INVENTION

A method for controlling a turbocharger is disclosed. Generally, these methods can be used in connection with an engine of a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy, for example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a method for controlling a turbocharger, comprising the steps of: receiving information related to a requested minimum boost pressure; determining a current boost pressure; comparing the current boost pressure with the requested minimum boost pressure; and maintaining the current boost pressure generally above the user selected minimum boost pressure by controlling operation of the turbocharger.

In another aspect, the method includes a step of receiving information related to a requested maximum boost pressure.

In another aspect, the requested maximum boost pressure is greater than the requested minimum boost pressure.

In another aspect, the requested maximum boost pressure is equal to the requested minimum boost pressure.

In another aspect, the turbocharger is associated with a pressure sensor that is configured to sense the current boost pressure.

In another aspect, the turbocharger is a variable nozzle turbocharger.

In another aspect, the invention provides a system for controlling a turbocharger, comprising: a first control system and a second control system; the first control system is configured to receive a requested minimum boost pressure from a user; and the second control system includes at least one pre-configured boost mode with a predetermined maximum boost pressure and a predetermined minimum boost pressure.

In another aspect, the first control system is associated with the control panel configured to receive input from the user related to the requested minimum boost pressure.

In another aspect, the second control system is associated with a control panel configured to receive input from the user related to a pre-configured boost mode.

In another aspect, the system includes a boost pressure sensor.

In another aspect, the turbocharger is a variable nozzle turbocharger.

In another aspect, the system includes more than one pre-configured boost mode.

In another aspect, the first control system is configured to receive a requested maximum boost pressure.

In another aspect, the invention provides a method for controlling a turbocharger, comprising the steps of: providing a control panel for selecting at least one pre-configured boost pressure mode, the pre-configured boost pressure mode being associated with a minimum boost pressure and a maximum boost pressure; receiving information related to at least one boost pressure mode; determining a current boost pressure; comparing the current boost pressure with the minimum boost pressure and the maximum boost pressure; and controlling the current boost pressure so that it remains between the minimum boost pressure and the maximum boost pressure.

In another aspect, the turbocharger is associated with more than one pre-configured boost pressure mode.

In another aspect, the turbocharger is associated with four pre-configured boost pressure modes, including an economy mode, a normal mode, a sport mode and a track mode.

In another aspect, the economy mode is configured to allow for maximum fuel economy.

In another aspect, the track mode is configured to deliver maximum power at all speeds.

In another aspect, the normal mode and the sport mode are configured to deliver greater power at all speeds than the economy mode, but less power at all speeds than the track mode.

In another aspect, each pre-configured boost mode is associated with a distinct boost pressure range and wherein the distinct boost pressure ranges do not overlap.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
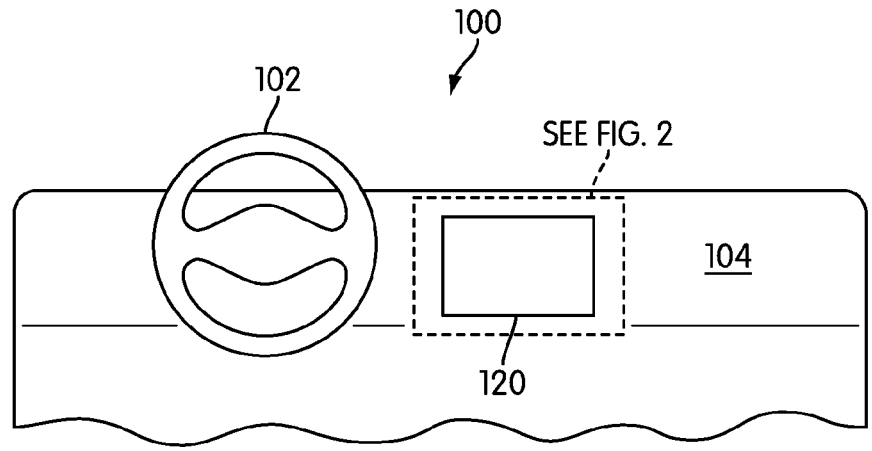
FIG. 1 is a schematic view of a preferred embodiment of a motor vehicle interior.

FIG. 1 is a schematic view of a preferred embodiment of motor vehicle interior 100. Motor vehicle interior 100 may include steering wheel 102, as well as other provisions for controlling the motor vehicle. In some embodiments, motor vehicle 100 may include dashboard 104. Dashboard 104 may include various features such as a speedometer, an odometer, a radio or other meters and devices associated with traditional dashboard displays.

Preferably, motor vehicle interior 100 includes provisions for controlling one or more systems associated with the motor vehicle. In some embodiments, motor vehicle interior 100 may include provisions for controlling a turbocharger associated with the motor vehicle. In a preferred embodiment, dashboard 104 may include control panel 120 that is configured to allow a user to manually control some aspects of a turbocharger.

Figure 2:
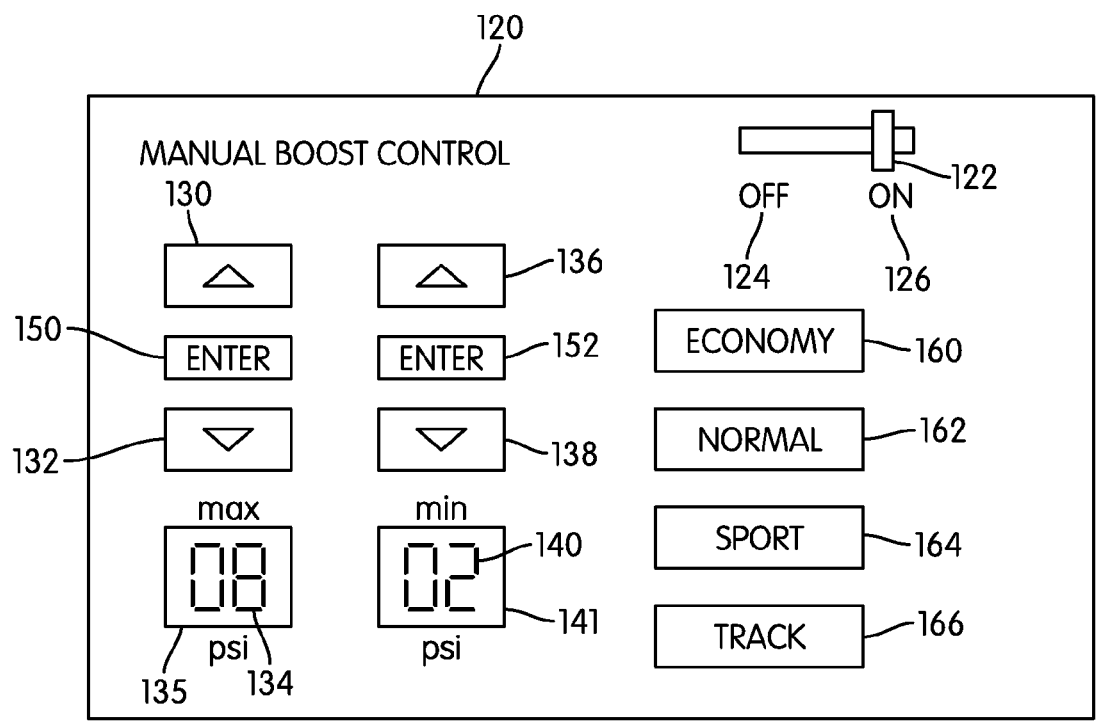
FIG. 2 is a front view of a preferred embodiment of a control panel.

FIG. 2 is a preferred embodiment of control panel 120. Control panel 120 is preferably a 'manual boost control' panel. In this embodiment, control panel 120 includes power switch 122. Power switch 122 preferably includes first position 124 and second position 126. First position 124 is an "off" position and second position 126 is an "on" position.

In some embodiments, control panel 120 may include provisions for selecting a boost pressure range. First upper button 130 and first lower button 132 are preferably configured to increase and decrease maximum display value 134 of first display 135. Likewise, second upper button 136 and second lower button 138 are preferably configured to increase and decrease minimum display value 140 of second display 141. Buttons 130, 132, 136 and 138 may be any kind of buttons including toggle switches. Preferably, displays 135 and 141 are LED displays. However, in other embodiments, displays 135 and 141 may be any type of displays, including, but not limited to, LCD displays, video displays, as well as other types of displays.

Preferably, maximum display value 134 and minimum display value 140 represent a maximum boost pressure value and a minimum boost pressure value, respectively. In the current embodiment, display values 134 and 140 are intended to be in psi units, however, in other embodiments, any pressure unit may be used. In other embodiments, no units may be indicated.

In some embodiments, control panel 120 may also include first intermediate button 150 and second intermediate button 152. Intermediate buttons 150 and 152 may be 'enter' buttons. Once a user has chosen particular values for maximum and minimum boost pressure, the user may lock these values or submit these values using intermediate buttons 150 and 152. This allows the user to toggle the value of the maximum and minimum boost pressures without influencing the turbocharger until they have selected the values they want. In other embodiments, no intermediate buttons may be used.

Preferably, control panel 120 includes provisions that allow a user to select pre-determined boost control ranges (where each range includes a maximum boost pressure and a minimum boost pressure). In this exemplary embodiment, control panel 120 includes first wide button 160, second wide button 162, third wide button 164 and fourth wide button 166, associated with an economy boost mode, a normal boost mode, a sport boost mode and a track boost mode, respectively. By selecting one of these pre-configured boost modes, using buttons 160, 162, 164 and 166, a user may manually adjust the range of allowed boost pressures without selecting a particular boost pressure minimum or boost pressure maximum. Instead, each boost mode may include various power characteristics. Details of each of these modes will be discussed later in this detailed specification.

For purposes of clarity, the manual boost control features are illustrated here within control panel 120 on dashboard 104. In other embodiments, however, various manual boost control features could be disposed elsewhere. Provisions for selecting maximum and minimum boost pressures, as well as provisions for selecting pre-configured boost modes could be disposed anywhere within motor vehicle interior 100. These provisions could take the form of buttons, levels or other types of input devices. In some cases, for example, these provisions could be voice actuated devices that allow the user to speak commands regarding maximum and minimum boost pressure values.

Throughout the remainder of this specification and throughout the claims, the features associated with manually selecting a maximum boost pressure and a minimum boost pressure are associated with a first control system while the features associated with selecting a preconfigured boost mode are associated with a second control system. Both systems are configured to include a minimum boost pressure and a maximum boost pressure in some cases. The first control system and the second control system are both preferably part of a larger 'manual boost control system' that is used to control a turbocharger based on user inputs.

Figure 3:
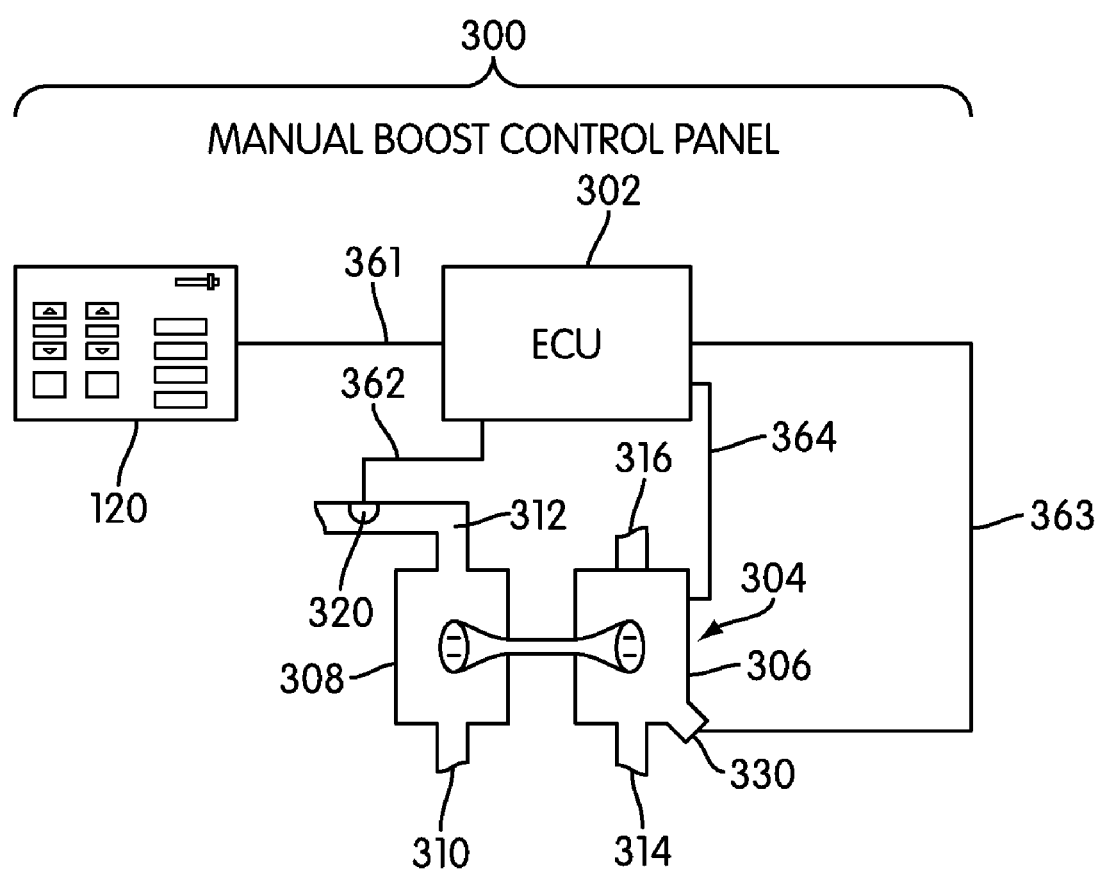
FIG. 3 is a schematic view of a preferred embodiment of a manual boost control system.

FIG. 3 is a preferred embodiment of various components that comprise manual boost control system 300. As previously discussed, manual boost control system 300 may include control panel 120 that is associated with motor vehicle interior 100. Additionally, manual boost control system 300 preferably includes electronic control unit 302 (hereby referred to as ECU 302) as well as turbocharger 304. ECU 302 may be a computer or part of an onboard computer that is configured to control manual boost control system 300.

Turbocharger 304 may be any type of turbocharger. In the preferred embodiment, turbocharger 304 may be a variable nozzle turbocharger. In other embodiments, turbocharger 304 could be a supercharger.

Generally, turbocharger 304 includes turbine 306 and compressor 308. Compressor 308 may include fresh intake line 310 and compressed air line 312. Preferably, compressed air line 312 is configured to transport compressed air from turbocharger 304 to an intercooler or directly to an intake manifold of an engine associated with turbocharger 304. Turbine 306 may be associated with exhaust intake line 314 and exhaust out line 316.

Preferably, manual boost control system 300 includes provisions for determining the boost pressure of the air that enters the engine. In some embodiments, manual boost pressure control 300 may include a pressure sensor of some kind. This pressure sensor is preferably disposed downstream of compressor 308. In the preferred embodiment, manual boost pressure system 300 includes pressure sensor 320 disposed within compressed air line 312.

Manual boost control system 300 may include provisions for relieving boost pressure. As is well known many turbochargers include waste-gates that provide a way of releasing excess exhaust at turbine 306. By decreasing the exhaust at turbine 306, turbine 306, and therefore compressor 308, may be slowed. This reduces the boost pressure downstream of compressor 308. In a preferred embodiment, turbocharger 304 includes waste-gate 330.

Manual boost control system 300 may also include provisions for increasing boost pressure even when the engine speed is not increasing. In some cases, the use of a variable nozzle turbocharger allows for the boost pressure to be increased or maintained even when the engine speed is not increasing. With this arrangement, turbocharger 304 may be configured to maintain or increase boost pressure even when the engine speed is decreasing.

Preferably, ECU 302 is connected to each of the various components of manual boost control system 300. In this embodiment, ECU 302 is associated with control panel 120 via first connection 361. Furthermore, ECU 302 may be associated with pressure sensor 320, waste-gate 330 and turbocharger 304 via second connection 362, third connection 363 and fourth connection 364, respectively. Each of these connections 361-364 may be physical connections such as electrical wires or wireless connections. In some embodiments, combinations of wired and wireless connections may be used.

FIGS. 4-7 refer to processes associated with manual boost control system 300. The steps of each of the following processes are discussed in conjunction with the preferred embodiment of control panel 120, shown in FIG. 2. However, it should be understood that each of the steps discussed here could also be accomplished using other types of control panels or provisions for manually selecting maximum and minimum boost pressures.

Figure 4:
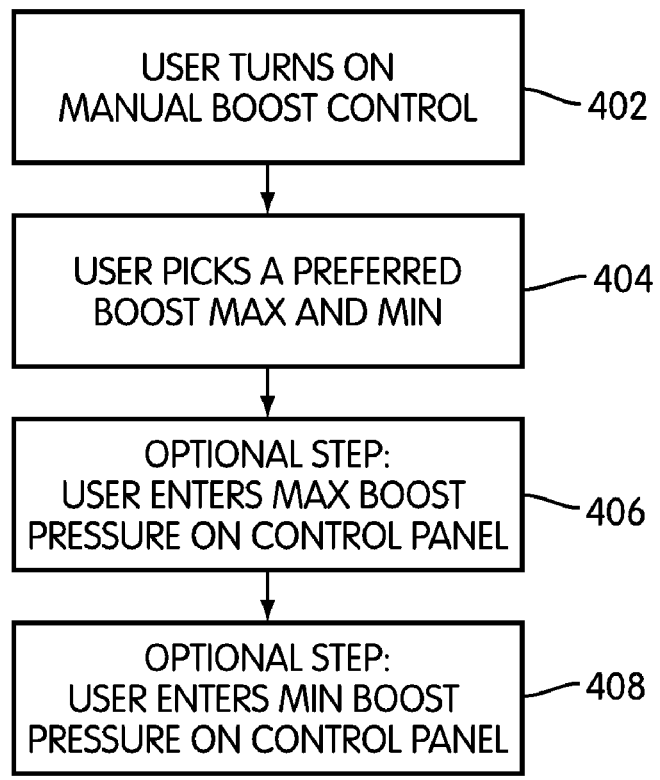
FIG. 4 is a preferred embodiment of a process for manually selecting a maximum and minimum boost pressure.

FIG. 4 is a preferred embodiment of a process for manually selecting a maximum and minimum boost pressure with manual boost control system 300. This process is generally associated with the first control system discussed above. The following steps may be performed by a driver or a passenger within motor vehicle interior 100. For purposes of generality, the term 'user' is used to denote an occupant of the motor vehicle that is responsible for operating control panel 120.

During a first step 402, the user preferably turns on manual boost control system 300 using power switch 122. Next, during a second step 404, the user may decide on a preferred maximum boost pressure and a preferred minimum boost pressure. At this point, the user has not entered any values on control panel 120. When a user has decided on preferred maximum and minimum boost pressures, the user may proceed to steps 406 and/or 408. It should be understood that in the context of the current embodiments, steps 406 and 408 are optional. In other words, a user may bypass step 406 and continue to step 408, or a user may proceed to step 406 and skip step 408. In some cases, for example, a user may not want to limit the boost pressure to a maximum value, in order to achieve the maximum allowed boost pressure at all times, but still may select a minimum value to allow for increased power at all speeds. Additionally, in some cases, a user may not want to select a minimum boost pressure, in order to facilitate fuel economy, but may select a maximum boost pressure in order to prevent instability in the engine.

Following second step 404, a user may proceed to step 406. During step 406, the user may enter a maximum boost pressure using control panel 120. This step is preferably accomplished by using first upper button 130 and first lower button 132 of control panel 120. Using buttons 130 and 132, the user may change the maximum display value 134 shown on first display 135. In some embodiments, the user may use first intermediate button 150, which preferably functions as an 'enter' or 'select' button, to confirm their choice for a maximum boost pressure value. At this point, the user may proceed to fourth step 408 or may stop.

Following either second step 404 or third step 406, a user may proceed to fourth step 408. During fourth step 408, the user may enter a minimum boost pressure using control panel 120. This step is preferably achieved by using second upper button 136 and second lower button 138 of control panel 120. Using buttons 136 and 138, the user may change the minimum display value 140 on second display 141. In some embodiments, the user may use second intermediate button 152, which preferably functions as an 'enter' or 'select' button, to confirm their choice for a minimum boost pressure value.

Figure 5:
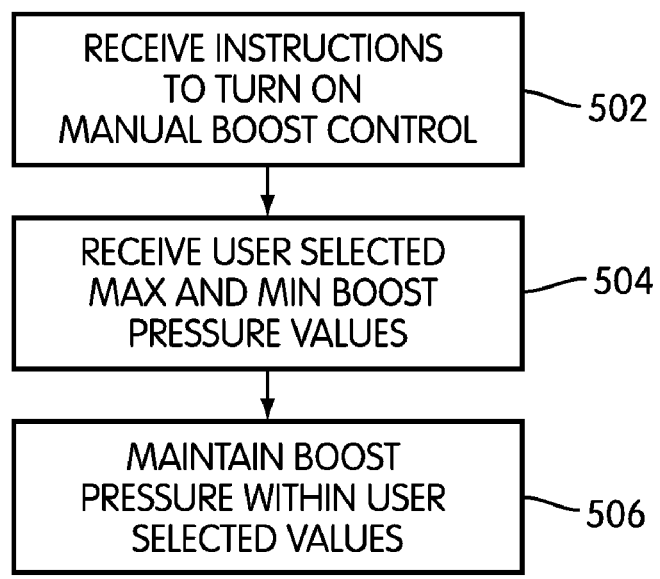
FIG. 5 is a preferred embodiment of a process for controlling the boost pressure using a manual boost control system.
Figure 6:
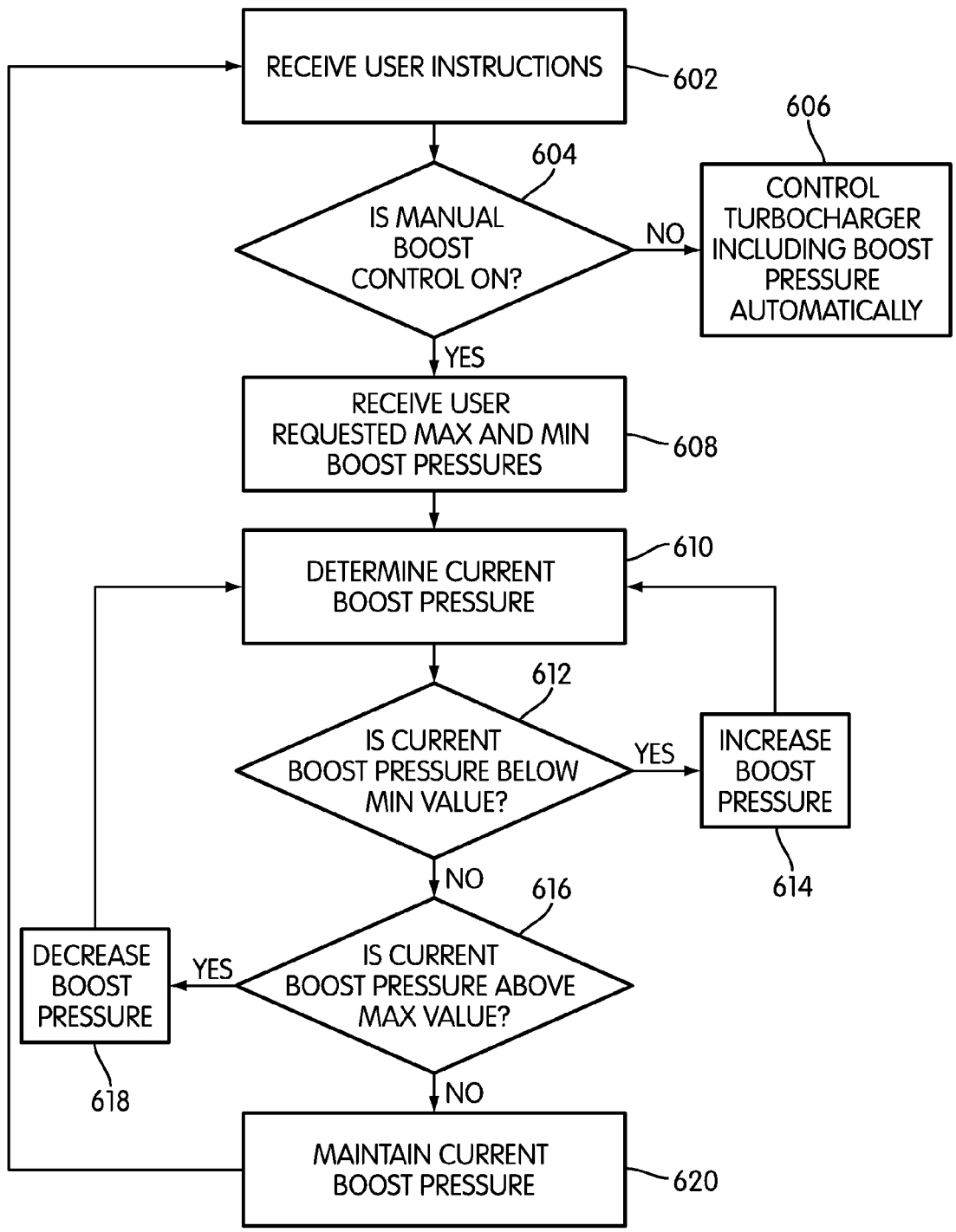
FIG. 6 is a preferred embodiment of a process for controlling boost pressure using a manual boost control system.

Once a user has selected a maximum boost pressure value and/or a minimum boost pressure value using control panel 120, ECU 302 preferably functions to maintain the boost pressure between these requested boost pressure values. The following processes, shown in FIGS. 5 and 6, are preferably performed by ECU 302. In some embodiments, however, other systems and/or devices could be configured to facilitate control of manual boost control system 300.

FIG. 5 is a preferred embodiment of a process for controlling the boost pressure using manual boost control system 300. During a first step 502, ECU 302 may receive instructions to turn on manual boost control. This step may be achieved by a signal that is sent from control panel 120 to ECU 302 via first connection 361, once the user has turned switch 122 to second position 126 (the "on" position). Next, during a second step 504, ECU 302 may receive a requested maximum boost pressure and a requested minimum boost pressure. The requested maximum boost pressure and the requested minimum boost pressure preferably correspond with maximum display value 134 and minimum display value 140, respectively, that have been selected by the user. Following second step 504, ECU 302 may proceed to third step 506. During third step 506, ECU 302 preferably maintains the actual boost pressure between the requested minimum boost pressure and the requested maximum boost pressure.

FIG. 6 is a preferred embodiment of a detailed process for controlling boost pressure using manual boost control system 300. The process discussed here is intended to clearly illustrate many of the details and sub-processes associated with the general process discussed with respect to the process illustrated in FIG. 5. As previously noted, the steps of the following process are preferably performed by ECU 302.

During step 602, ECU 302 preferably receives instructions from a user. These instructions are received from control panel 120 via first electrical connection 361. Following step 602, ECU 302 preferably determines if the manual boost control has been activated, during step 604. If the answer is no, in other words the manual boost control is off, ECU 302 may proceed to step 606. During step 606, ECU 302 controls the turbocharger, including the boost pressure, automatically. The term 'automatically' as used here refers to the operation of the turbocharger without any input from the user, including any processes or procedures for operating a turbocharger known in the art which do not require input from the user. During step 606, ECU 302 may further wait for instructions from the user regarding manual boost control system 300.

If, during step 604, ECU 302 determines that manual boost control has been activated, then ECU 302 may proceed to step 608. During step 608, ECU 302 preferably receives, and in some cases stores, a requested maximum boost pressure and a requested minimum boost pressure. As previously discussed, the requested maximum boost pressure preferably coincides with maximum display value 134, while the requested minimum boost pressure preferably coincides with minimum display value 140, which are the user selected values.

Following step 608, ECU 302 preferably proceeds to step 610. During step 610, ECU 302 may determine the current boost pressure. This is preferably achieved using pressure sensor 320. In other words, a signal including information about the current boost pressure is preferably sent from pressure sensor 320 to ECU 302 via second connection 362.

Next, during step 612, ECU 302 determines if the current boost pressure is below the requested minimum value. If the answer is yes, then ECU 302 proceeds to step 614. During step 614, ECU 302 preferably increases the current boost pressure. As previously discussed, the boost pressure may be increased, even when the engine speed is not increasing, by using a variable nozzle turbocharger. In this case, a signal could be sent from ECU 602 to turbocharger 304, via fourth connection 364, to operate the variable nozzle turbocharger in a manner that increases the boost pressure. In other embodiments, increased boost pressure may be achieved using a method other than a variable nozzle turbocharger.

Following step 614, ECU 302 preferably proceeds to step 610. In some cases, the current boost pressure may be increased incrementally. In such cases, ECU 302 may cycle through steps 610, 612 and 614 many times before the current boost pressure is greater than or equal to the requested minimum boost pressure. In other embodiments, ECU 302 may determine the difference between the current boost pressure and the requested minimum boost pressure and adjust the boost pressure by an increment equal to or greater than that difference.

If, during step 612, the current boost pressure is not below the requested minimum boost pressure, then ECU 302 may proceed to step 616. During step 616, ECU 302 preferably compares the current boost pressure with the requested maximum boost pressure. If the current boost pressure value is greater than the requested maximum boost pressure, then ECU 302 may proceed to step 618, otherwise ECU 302 may proceed to step 620. During step 618, ECU 302 preferably sends a signal to waste-gate 330, via third connection 363, to open. As waste-gate 330 opens and releases exhaust near turbine 306, the boost pressure should decrease. Following this, ECU 302 may proceed to step 610.

In some embodiments, during step 618, ECU 302 decreases the current boost pressure incrementally, thus steps 610, 612, 616 and 618 may happen in rapid succession. In other embodiments, ECU 302 may decrease the current boost pressure until it is below the requested maximum boost pressure in a single step.

When the current boost pressure is between the requested maximum boost pressure and the requested minimum boost pressure, ECU 302 will proceed from step 610, through steps 612 and 616, to step 620. During step 620, ECU 302 may act to maintain the current boost pressure. Otherwise, ECU 302 may allow the boost pressure to vary according to engine speed or other factors, as may naturally occur within a turbocharged system. Following step 620, ECU 302 may proceed to step 602 again. At this point, ECU 302 may receive new instructions from the user (such as to shut off the manual boost control), and then proceed through the remaining steps again. This cycle preferably continues until the user shuts off manual boost control. It should be understood that a user may submit new values for the requested maximum boost pressure and the requested minimum boost pressure at any time during this process.

It should be understood that the first control system, including provisions that allow a user to select a requested maximum boost pressure and a requested minimum boost pressure, may be configured so that the user can select a single constant boost pressure, rather than a boost pressure range. In some cases, this could be done by including a separate set of buttons configured to allow a user to enter a single boost pressure that the system must maintain at all times. In a preferred embodiment, the user may simply enter the same boost pressure value for the boost pressure maximum and the boost pressure minimum. Using this configuration, the system would maintain a constant boost pressure equal to the value of the requested maximum boost pressure and the requested minimum boost pressure whenever these boost pressure values are equal.

Preferably, manual boost control system 300 also includes provisions for allowing a user to select between several pre-configured boost modes. Each boost mode may be associated with a particular boost pressure range, including a minimum boost pressure and a maximum boost pressure. Using different boost modes allows a user to achieve different ranges of power as a function of engine speed.

Figure 7:
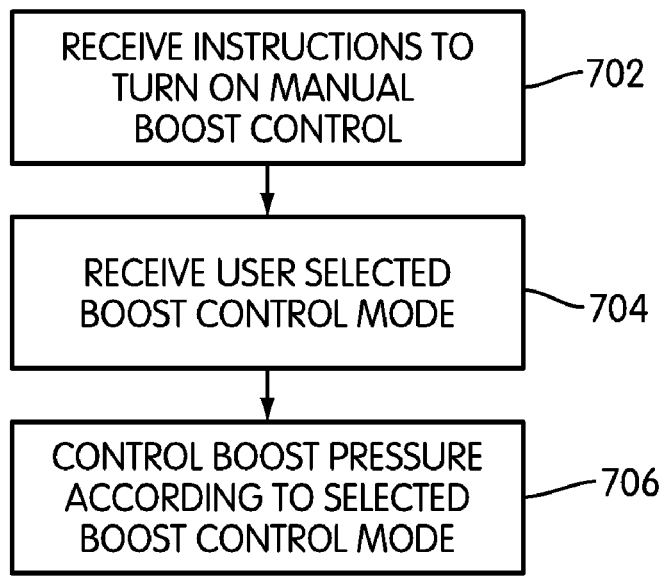
FIG. 7 is a preferred embodiment of a process for controlling a manual boost control system.

FIG. 7 is a preferred embodiment of a process for controlling a manual boost control system. This process is performed using the second control system that was previously discussed. As with the previous embodiments, the steps in the following process are preferably performed by ECU 302. During first step 702, ECU 302 may receive instructions to turn on manual boost control. In the current embodiment, ECU 302 preferably controls turbocharger 304, including the boost pressure, automatically when the manual boost control is not engaged.

Following first step 702, ECU 302 may receive a user selected boost control mode. In the current embodiment, as previously discussed, there are pre-configured boost control modes available to the user. Wide buttons 160, 162, 164 and 166 of control panel 120 preferably represent four pre-configured boost modes. In this preferred embodiment, first wide button 160 is associated with an economy boost mode, second wide button 162 is associated with a normal boost mode, third wide button 164 is associated with a sport boost mode and fourth button 166 is associated with a track boost mode.

Generally, each of the boost modes are associated with different boost pressure ranges, where each range includes a pre-configured minimum and maximum boost pressure. For example, in the current embodiment, economy boost mode may be associated with a minimum boost pressure of 0 psi, and a maximum boost pressure of 2 psi. In this mode, the boost pressure is limited to rather low values and helps conserve fuel in many cases. This mode could be useful for highway cruising.

The normal boost mode may be associated with a minimum boost pressure of 2 psi and a maximum boost pressure of 6 psi. In this mode, the boost pressure can achieve higher values than using the economy mode, but the boost pressure is still limited to a maximum of 6 psi, well below the maximum achievable boost pressure for turbocharger 304. Also, unlike economy mode, the normal mode has a minimum boost pressure of 2 psi, so that some additional power is achieved at all engine speeds. The normal boost mode may be used for passing situations, or for heavily loaded vehicles.

The sport mode may be associated with boost pressures between 6 psi and 10 psi. In this mode, the motor vehicle achieves a lot more power at all speeds than with the economy or normal mode, however the boost pressure is prevented from maxing out.

Finally, the track mode may be associated with a constant boost pressure of 12 psi. This value is presumably at or near the maximum achievable boost pressure for turbocharger 304. In track mode, peak boost would be allowed but at the cost of fuel economy. Such a mode may be useful in racing or other activities with high power demands at all speeds.

Following second step 704, ECU 302 preferably proceeds to third step 706. During third step 706, ECU 302 preferably controls the current boost pressure according to the selected boost pressure mode. In some embodiments, ECU 302 may determine the current boost pressure according to pre-defined power curves associated with each boost mode.

Figure 8:
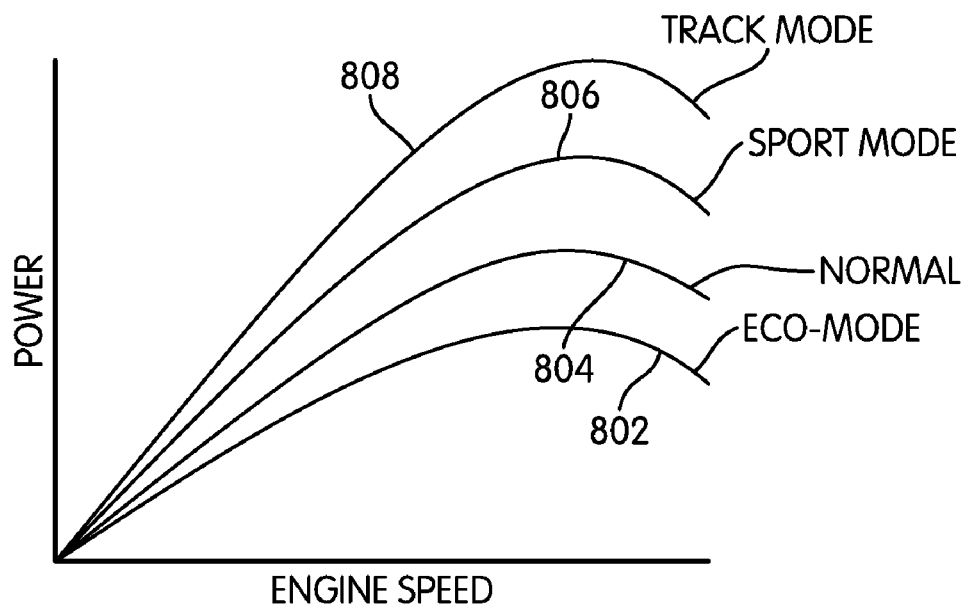
FIG. 8 is a preferred embodiment of a relationship of available power to engine speed for different boost modes.

An example of a preferred embodiment for the available power as a function of engine speed for each mode is illustrated in FIG. 8. The current embodiment includes economy power curve 802, normal power curve 804, sport power curve 806 and track power curve 808. If, for example, the user chooses the economy power mode, ECU 302 may control the boost pressure to achieve a value for the power that lies on economy power curve 802. The particular value will depend on the engine speed. Presumably, economy power curve 802 is associated with values for the power that may be achieved by keeping the boost pressure between 0 psi and 2 psi.

Likewise, the remaining power curves 804, 806 and 808 may be used to control the boost pressure for each associated power mode. Generally, as with the economy power mode, ECU 302 may control the boost pressure to achieve a value on the associated power curve according to the current engine speed. Presumably, by controlling the boost pressure to achieve power values on the associated power curve, the boost pressure will remain between the limits associated with each boost mode.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method for controlling an operating mode of an engine including a turbocharger having a turbine and compressor, and a control unit, the method comprising the steps of:
   determining the operating mode of the engine;
   receiving information from a user related to a user selected minimum boost pressure;
   determining a current boost pressure from a pressure sensor positioned downstream of the compressor of the turbocharger;
   comparing the current boost pressure with the user selected minimum boost pressure; and
   maintaining the current boost pressure to be at least one of equal to and greater than the user selected minimum boost pressure by controlling operation of the turbocharger.

2. The method according to claim 1, wherein the method includes a step of receiving information related to a user selected maximum boost pressure.

3. The method according to claim 2, wherein the user selected maximum boost pressure is greater than the user selected minimum boost pressure.

4. The method according to claim 2, wherein the user selected maximum boost pressure is substantially equal to the user selected minimum boost pressure.

5. The method according to claim 1, wherein the pressure sensor is disposed in a compressed air line disposed downstream of the turbocharger.

6. The method according to claim 1, wherein the turbocharger is a variable nozzle turbocharger, and wherein the control unit controls the variable nozzle turbocharger to change the boost pressure according to the operating mode of the engine.

7. A method for controlling an engine including a turbocharger having a turbine and compressor, comprising the steps of:
providing a control unit; and
providing a control panel configured to allow a user to choose from at least one pre-configured boost pressure mode, the at least one pre-configured boost pressure mode being associated with a preselected minimum boost pressure and a preselected maximum boost pressure;
determining an operating condition of the engine;
receiving information related to the at least one boost pressure mode chosen by the user;
determining a current boost pressure with a pressure sensor located downstream of the turbocharger compressor; and
providing a signal to the engine to adjust operation of the engine so that the current boost pressure is maintained to be in a boost pressure range of at least one of equal to and greater than the preselected minimum boost pressure and below the preselected maximum boost pressure.

8. The method according to claim 7, wherein the turbocharger is associated with more than one pre-configured boost pressure modes.

9. The method according to claim 8, wherein the turbocharger is associated with four pre-configured boost pressure modes, including an economy mode, a normal mode, a sport mode and a track mode.

10. The method according to claim 9, wherein the economy mode is configured to maximize fuel economy of the engine.

11. The method according to claim 10, wherein the track mode is configured to maximize power at all engine speeds.

12. The method according to claim 11, wherein the normal mode and the sport mode are configured to deliver greater power at all engine speeds than the economy mode, but less power at all engine speeds than the track mode.

13. The method according to claim 9, wherein at least two pre-configured boost modes are associated with distinct boost pressure ranges and wherein the distinct boost pressure ranges do not overlap.

14. A system for controlling an engine equipped with a turbocharger having a turbine and a compressor, comprising:
an electronic control unit;
a first control system;
wherein the first control system provides a user selected minimum boost pressure from a user to the electronic control unit, and
a second control system;
wherein the second control system includes at least one pre-configured boost mode with a predetermined maximum boost pressure and a predetermined minimum boost pressure available to a user wherein the user selects the at least one pre-configured boost mode;
wherein the electronic control unit receives information related to the user's selection of the pre-configured boost mode; and
wherein the electronic control unit is configured to determine an operating mode of the engine; and to control the turbocharger such that a boost pressure downstream of the turbocharger compressor is maintained above the user selected minimum boost pressure or in the pre-configured boost mode requested by the user.

15. The system according to claim 14, wherein the first control system is associated with a control panel configured to receive input from the user related to the user selected minimum boost pressure.

16. The system according to claim 15, wherein the second control system is associated with the control panel configured to receive input from the user related to a pre-configured boost mode.

17. The system according to claim 14, wherein the system includes a boost pressure sensor located downstream of the turbocharger compressor.

18. The system according to claim 14, wherein the turbocharger is a variable nozzle turbocharger.

19. The system according to claim 14, wherein the system includes more than one pre-configured boost mode.

20. The system according to claim 14, wherein the first control system is configured to receive a user selected maximum boost pressure.

* * * * *